(12) United States Patent
Peters et al.

(10) Patent No.: US 11,015,457 B2
(45) Date of Patent: May 25, 2021

(54) MULTI-WALLED AIRFOIL CORE

(71) Applicant: United Technologies Corporation, Farmington, CT (US)

(72) Inventors: Christopher J. Peters, West Hartford, CT (US); Emma J. Place, New Hartford, CT (US); Jeffrey J. DeGray, Somers, CT (US); Dominic J. Mongillo, West Hartford, CT (US); Timothy J. Jennings, West Hartford, CT (US); Raymond Surace, Newington, CT (US); Jeremy B. Fredette, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 73 days.

(21) Appl. No.: 16/202,483

(22) Filed: Nov. 28, 2018

(65) Prior Publication Data
US 2020/0102841 A1    Apr. 2, 2020

Related U.S. Application Data

(60) Provisional application No. 62/741,322, filed on Oct. 4, 2018, provisional application No. 62/739,657, filed on Oct. 1, 2018.

(51) Int. Cl.
*B22C 9/10* (2006.01)
*B22D 25/02* (2006.01)
*F01D 5/18* (2006.01)

(52) U.S. Cl.
CPC .............. *F01D 5/189* (2013.01); *B22D 25/02* (2013.01); *F05D 2220/32* (2013.01); *F05D 2230/211* (2013.01)

(58) Field of Classification Search
CPC ........... B22C 9/10; B22C 9/103; B22C 9/108; B22C 9/046; B22D 25/02; F01D 5/18; F01D 5/189; F05D 2220/32; F05D 2230/211; F05D 2250/185; Y02T 50/60
USPC ......................... 164/137, 369, 28; 416/97 R
See application file for complete search history.

(56) References Cited

U.S. PATENT DOCUMENTS

| 6,974,308 | B2 | 12/2005 | Halfmann et al. |
| 2017/0183969 | A1 | 6/2017 | Dujol et al. |
| 2018/0050386 | A1 | 2/2018 | Talman |
| 2018/0156042 | A1 | 6/2018 | Mongillo, Jr. et al. |
| 2018/0156043 | A1 | 6/2018 | Chum et al. |

(Continued)

FOREIGN PATENT DOCUMENTS

| EP | 3330487 | 6/2018 |
| WO | 20150181488 | 12/2015 |

OTHER PUBLICATIONS

EP Extended Search Report for EP Application No. EP 19200847.2 dated Feb. 19, 2020.

*Primary Examiner* — Kevin P Kerns
(74) *Attorney, Agent, or Firm* — Carlson, Gaskey & Olds, P.C.

(57) ABSTRACT

A method of forming an airfoil, includes forming a hybrid skin core, a tip flag core, and a trailing edge core. The hybrid skin core, tip flag core, and trailing edge core are connected to form a first core portion. A leading edge core and a serpentine core are formed. The first core portion, the leading edge core, and the serpentine core are assembled together to form an airfoil core. An airfoil is formed around the airfoil core.

12 Claims, 11 Drawing Sheets

(56) References Cited

U.S. PATENT DOCUMENTS

2018/0156045 A1 6/2018 Clum et al.
2018/0306035 A1 10/2018 Eneau

MULTI-WALLED AIRFOIL CORE

CROSS-REFERENCE TO RELATED APPLICATIONS

This disclosure claims priority to U.S. Provisional Application No. 62/741,322 filed Oct. 4, 2018 and claims priority to U.S. Provisional Application No. 62/739,657, which was filed on Oct. 1, 2018. Both of these applications are incorporated herein by reference.

BACKGROUND

This application relates to a multi-walled airfoil core and a method for producing a multi-walled airfoil.

Gas turbine engines typically include a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of a gas turbine engine, such as turbine blades, may include cooling schemes that circulate airflow to cool the component during engine operation. Thermal energy is transferred from the component to the airflow as the airflow circulates through the cooling scheme to cool the component.

Gas turbine engine airfoils, such as turbine blades and turbine vanes, can be fabricated by investment casting. For instance, in investment casting, a ceramic or refractory metal core is arranged in a mold and coated with a wax material, which provides a desired shape. The wax material is then coated with another material, such as a metallic or ceramic slurry that is hardened into a shell. The wax is melted out of the shell and molten metal is then poured into the remaining cavity. The metal solidifies to form the airfoil. The core is then removed, leaving internal passages within the airfoil. Typically, the passages are used for cooling the airfoil.

SUMMARY

In one exemplary embodiment, a method of forming an airfoil, includes forming a hybrid skin core, a tip flag core, and a trailing edge core. The hybrid skin core, tip flag core, and trailing edge core are connected to form a first core portion. A leading edge core and a serpentine core are formed. The first core portion, the leading edge core, and the serpentine core are assembled together to form an airfoil core. An airfoil is formed around the airfoil core.

In a further embodiment of any of the above, the airfoil is formed by investment casting.

In a further embodiment of any of the above, the hybrid skin core, tip flag core, trailing edge core, leading edge core, and serpentine core are injection molded.

In a further embodiment of any of the above, the trailing edge core and the hybrid skin core are formed concurrently in a first die.

In a further embodiment of any of the above, the tip flag core, trailing edge core, and hybrid skin core are formed concurrently in the first die.

In a further embodiment of any of the above, the leading edge core and the serpentine core are formed concurrently in a second die.

In a further embodiment of any of the above, the leading edge core and the serpentine core are connected to form a second core portion.

In a further embodiment of any of the above, a rod is inserted into the leading edge core before forming the airfoil.

In a further embodiment of any of the above, the rod extends to a feature radially outward of tip flag core.

In a further embodiment of any of the above, the rod is removed after forming the airfoil to form a port near a leading edge of the airfoil.

In a further embodiment of any of the above, assembling the airfoil core comprises inserting a rod into the serpentine core and the tip flag core.

In a further embodiment of any of the above, the airfoil core contains one of ceramic, alumina, silica, and a metallic alloy.

In another exemplary embodiment, an airfoil core includes a first core portion that has a hybrid skin core, a tip flag core, and a trailing edge core. A second core portion has a serpentine core and a leading edge core.

In a further embodiment of any of the above, the hybrid skin core portion, tip flag core and trailing edge core are injection molded as a single structure.

In a further embodiment of any of the above, the serpentine core and the leading edge core are injection molded as a second single structure.

In a further embodiment of any of the above, the hybrid skin core is arranged along a suction side of the airfoil core. The serpentine core is arranged along a pressure side of the airfoil core. The tip flag core extends axially from the hybrid skin core to a trailing end of the airfoil core radially outward of at least a portion of the serpentine core.

In a further embodiment of any of the above, a rod connects the serpentine core and the tip flag core.

In a further embodiment of any of the above, the hybrid skin core and trailing edge core are connected at an inlet.

In a further embodiment of any of the above, a rod connects the trailing edge core and the tip flag core.

In a further embodiment of any of the above, the trailing edge core and the tip flag core are connected via core material beyond the airfoil trailing edge.

In another exemplary embodiment, an airfoil includes a body that extends radially from a platform to a tip, axially from a leading edge to a trailing edge, and has a thickness between a pressure side and a suction side. A hybrid skin cooling passage is arranged along the suction side. A tip flag cooling passage extends along the tip between the hybrid skin cooling passage and the trailing edge and is in fluid communication with the hybrid skin cooling passage. A trailing edge cooling passage extends from the platform to the tip flag cooling passage.

In a further embodiment of any of the above, the serpentine cooling passage has a turbulator on one passage surface.

DETAILED DESCRIPTION

Figure 1:
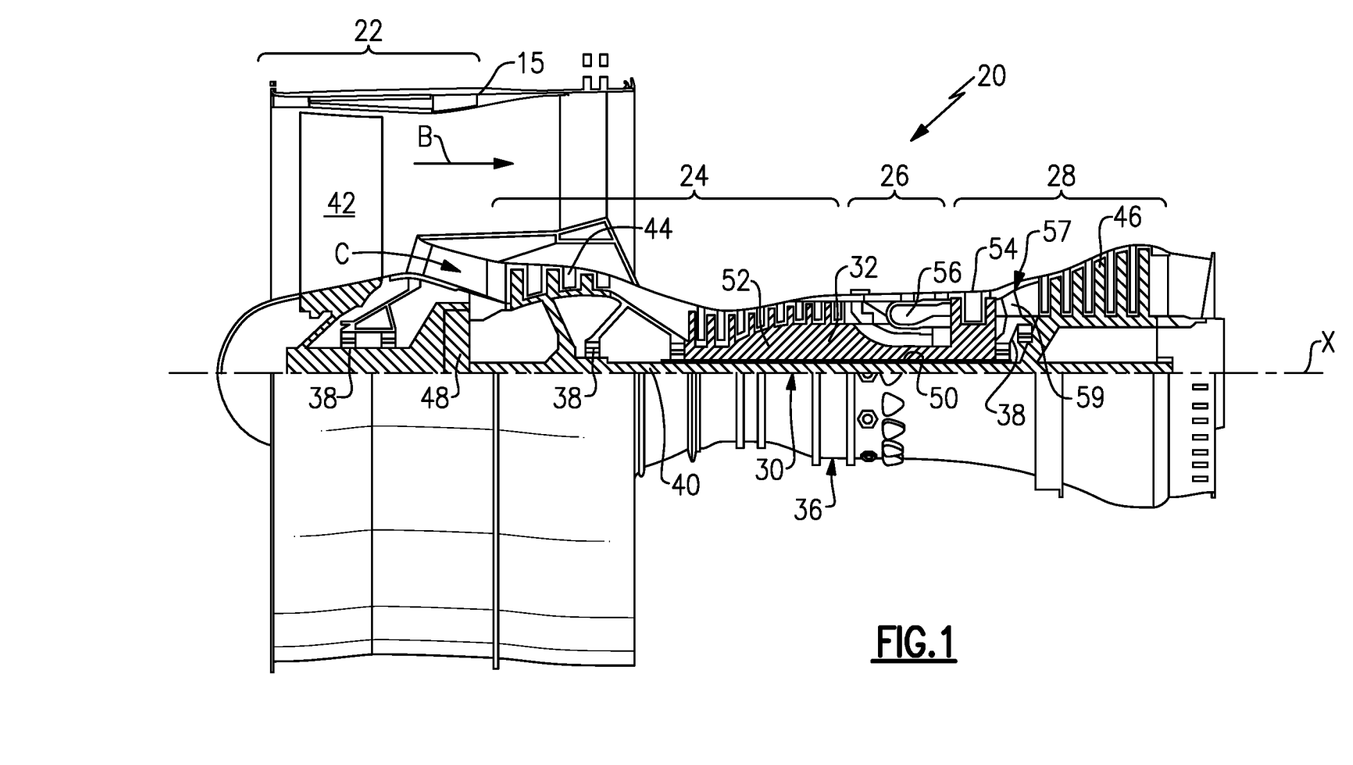
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, having single or multiple fan streams.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
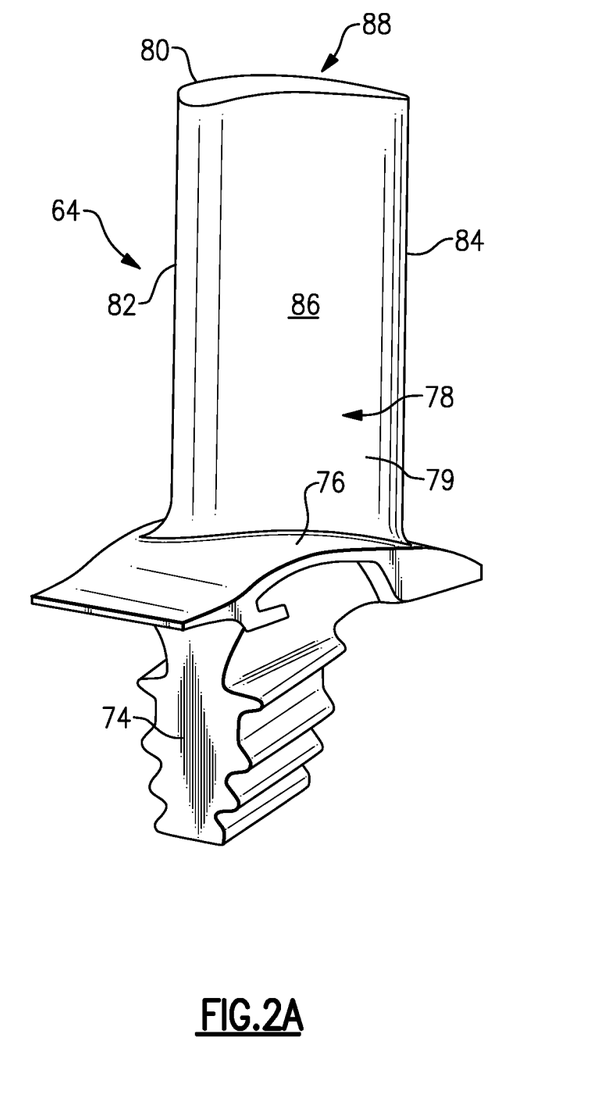
FIG. 2A is a perspective view of an airfoil.

The turbine section 28 includes a rotor having one or more blades or airfoils that are rotatable about the engine axis X in the core flow path C. FIG. 2A illustrates an example turbine blade 64. A root 74 of each turbine blade 64 is mounted to a rotor disk. The turbine blade 64 includes a platform 76, which provides the inner flow path, supported by the root 74. An airfoil 78 extends in a radial direction R (shown in FIG. 2B) from the platform 76 to a tip 80. The airfoil 78 provides leading and trailing edges 82, 84. The tip 80 is arranged adjacent to a blade outer air seal (not shown).

Figure 2B:
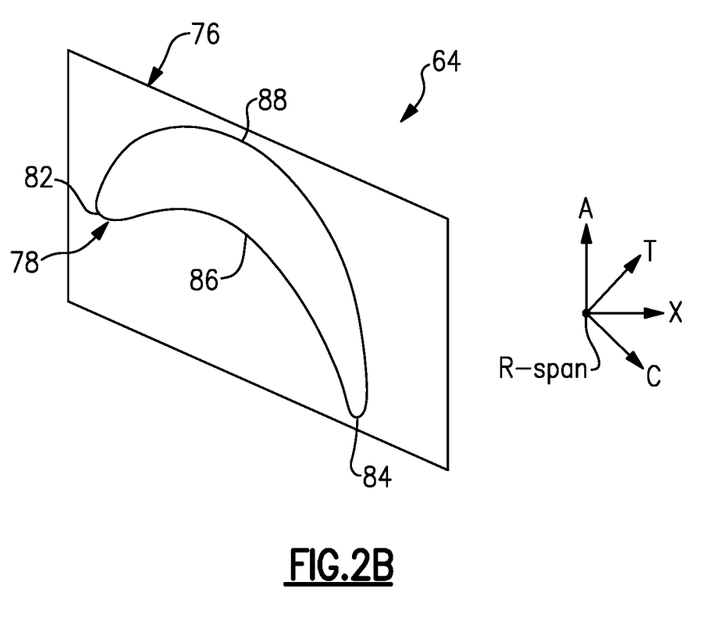
FIG. 2B is a plan view of the airfoil illustrating directional references.

FIGS. 2A and 2B somewhat schematically illustrate an exterior airfoil surface 79 extending in a chord-wise direction C from a leading edge 82 to a trailing edge 84. The airfoil 78 is provided between pressure (typically concave) and suction (typically convex) walls 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80. It should be understood that the airfoil 78 may be utilized in other parts of the gas turbine engine 20, or in other gas turbine engines.

Figure 3A:
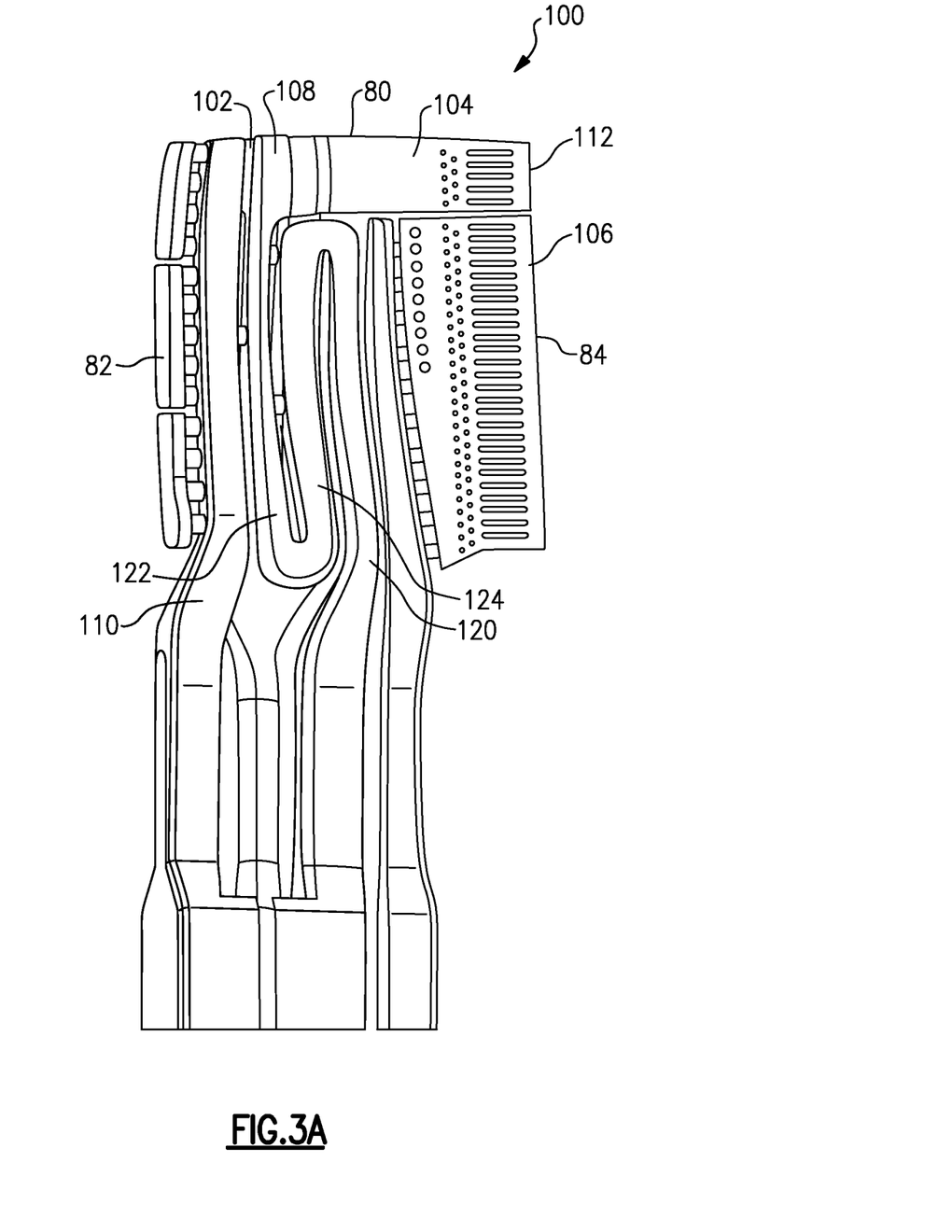
FIG. 3A shows an airfoil core from the pressure side.
Figure 3B:
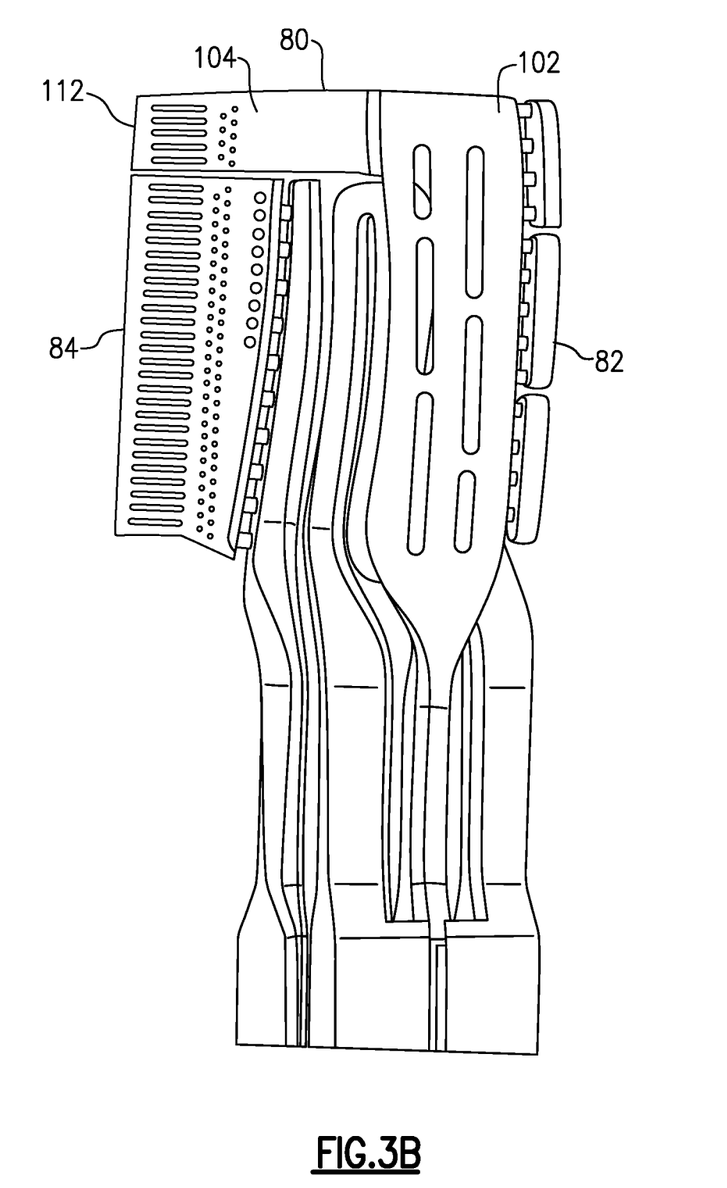
FIG. 3B shows an airfoil core from the suction side.

The airfoil 78 is formed by investment casting a metallic alloy, such as a nickel alloy, or other material in a mold around an airfoil core 100, shown in FIGS. 3A-3B. As can be appreciated, the core 100 includes sections that correspond to portions of the cooling passages of the airfoil 78. FIG. 3A shows the airfoil core 100 from the pressure side 86, while FIG. 3B shows the airfoil core 100 from the suction side 88. The example airfoil core 100 includes a hybrid skin core 102, a tip flag core 104, a trailing edge core 106, a serpentine core 108, and a leading edge core 110.

The airfoil core 100 may be fabricated using variety of manufacturing methods and used in conjunction with conventional investment casting processes. Core manufacturing methods may include, but are not limited to conventional core die tooling, injection molding, flexible tooling, fugitive core, lithographic tooling, and/or advanced additive manufacturing processes to directly fabricate integral ceramic cores for single and multi-walled cooling design concepts. Alternatively the airfoil cooling configuration may be directly fabricated using laser powder bed metal fusion additive manufacturing processes such as direct metal laser sintering (DMLS) or Selective Laser Sintering (SLS) methods. The core 100 is injection molded from a material that contains ceramic, silica or alumina aggregate and/or elements of a metal alloy material, for example. Solid structures define the core 100, which then produce void structures in the airfoil 78, after the core material is leached out of the metal airfoil as part of the investment casting process. These void structures make up a cooling passage network. Conversely, void structures of the core 100 produce solid structures in the airfoil 78. The core 100 may have several internal geometric features defining the internal core passages, cooling and heat transfer augmentation features, (i.e.; trip strips, crossovers, impingement rib features), and core producibility features, (i.e.; core printouts, chaplets, and core bumpers).

The hybrid skin core 102 forms a hybrid skin cooling passage that extends radially and is provided in a thickness direction between the core cooling passages and the suction side 88 of the airfoil 78. The hybrid skin cooling passage provides double wall cooling, which improves local thermal cooling effectiveness of the turbine blade 64. In some embodiments, film cooling holes may be drilled into the hybrid skin cooling passage to create a thin film boundary layer that protects the airfoil 78 from hot gases in the core flow path C. The hybrid skin cooling passage receives cooling fluid from a cooling source at the hybrid skin core inlet 130. The hybrid skin cooling passages, located immediately adjacent to the airfoil suction side leading edge, are positioned to shield the leading edge feed cavity 110 as well as shield other cooling passages, such as a serpentine cooling passage on the pressure side formed by the serpentine core 108. This shielding reduces cooling air heat pickup of the airflow in the leading edge feed passage 110 and the serpentine cooling passages by reducing the net heat flux emanating from the hot external airfoil wall along the suction side surfaces immediately adjacent to the leading edge feed passage 110 and the serpentine cooling passages. The reduction in cooling air temperature heat pickup enables a more effective thermal cooling design configuration by maximizing the potential temperature gradient between the external gas temperature and the colder internal cooling air temperature. The reduction in cooling air heat pickup also lowers the temperature of the local insulating boundary layer of the film cooling air, which thereby suppresses the local external heat flux and subsequent external hot wall metal temperatures.

In some embodiments, the shielding provided by the suction side hybrid skin core cavities may allow for the elimination of some turbulator features. For example, suction side internal trip strip features along the leading edge cooling passage 110 and serpentine cooling passages immediately adjacent to the cold internal wall formed between the suction side hybrid skin cooling passages, and the leading edge cooling passage 110 and the serpentine cooling passages may not be necessary. The additional convective heat transfer augmentation from trip strips or turbulators is not required along the internal cooling passage surfaces immediately adjacent to the cold internal wall. Therefore the overall pressure drop within the leading edge feed passage 110 and the serpentine cooling circuit may be significantly reduced due to the lower friction losses associated with cooling passages having internal trip strips features present along only one of cooling passage surfaces immediately adjacent to the external airfoil wall pressure side 86.

The tip flag core 104 forms a tip flag cooling passage extending from the hybrid skin core cooling passage to the trailing edge 84 near the airfoil tip 80. The tip flag core 104 may be joined to or integrated with the hybrid skin core 102. This allows the cooling air from the hybrid skin passage to be reused to cool the tip flag cooling passage. The predominately axially flowing tip flag cooling passage is arranged to maximize the internal convective heat transfer and provide uninterrupted access for optimization of tip film cooling holes, distributed along the pressure side tip surface, a pressure side tip shelf, and/or a tip squealer pocket. The ability to tailor the tip film cooling enables the local thermal cooling effectiveness of the airfoil tip 80 to be significantly improved by more efficiently reducing local tip operating metal temperatures and increasing tip durability oxidation and thermal mechanical fatigue (TMF) capability. The improvement in airfoil tip durability ensures that a minimum tip clearance between the airfoil tip 80 and the blade outer air seal is maintained throughout the life cycle of engine operation. The ability to minimize tip clearance between the airfoil tip 80 and a blade outer air seal is necessary to ensure the optimum performance characteristics of the turbine are retained.

Figure 7A:
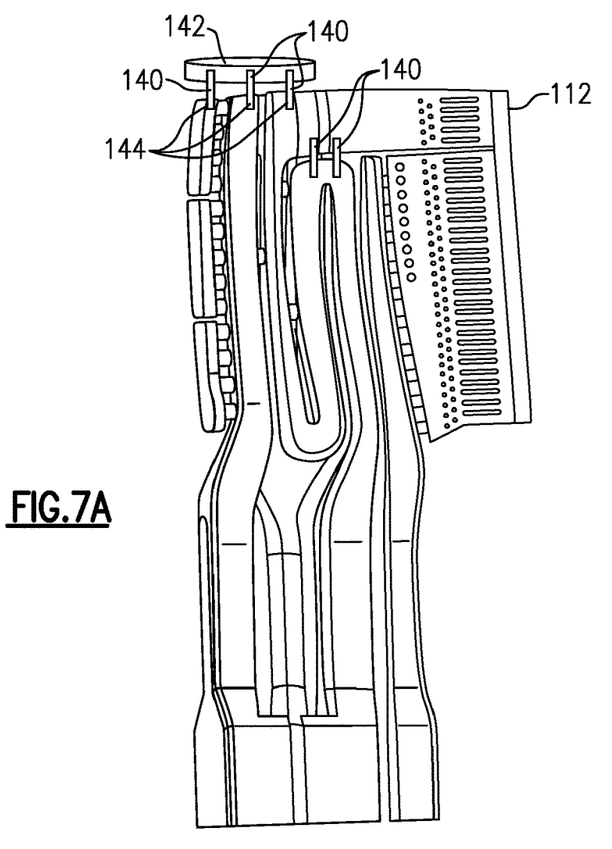
FIG. 7A shows a portion of an airfoil core from the pressure side.

The trailing edge core 106 forms a trailing edge cooling passage extending radially between the pressure and suction sides 86, 88, and extending axially to the trailing edge 84. Cooling air enters the trailing edge cooling passage via the trailing edge inlet 132. In some embodiments, the hybrid skin core 102 is connected to the trailing edge core 106 and the tip flag core 104. The hybrid skin core 102 and trailing edge core 106 may be connected at the tip flag core 104 and/or at the inlets 130, 132 and/or at the exit of the tip flag exit 112 and the exit of the trailing edge 84, external to the airfoil 78. In one embodiment, additional stock may be added to extend core material of the tip flag exit 112 and the exit of the trailing edge 84 in order to connect the two core passages at a location external to the airfoil 78 trailing edge geometry (shown in FIG. 7A). This arrangement may help minimize the relative displacement between the tip flag core 104 and trailing edge core 106. Joining the suction side hybrid skin core 102, the tip flag core 104 and the trailing edge 84 during the core injection and manufacturing process may significantly improve casting process capability by improving internal and external wall control, relative core displacement, and core true position tolerance during wax injection and subsequent metal pour operations as part of the investment casting process.

Figure 4:
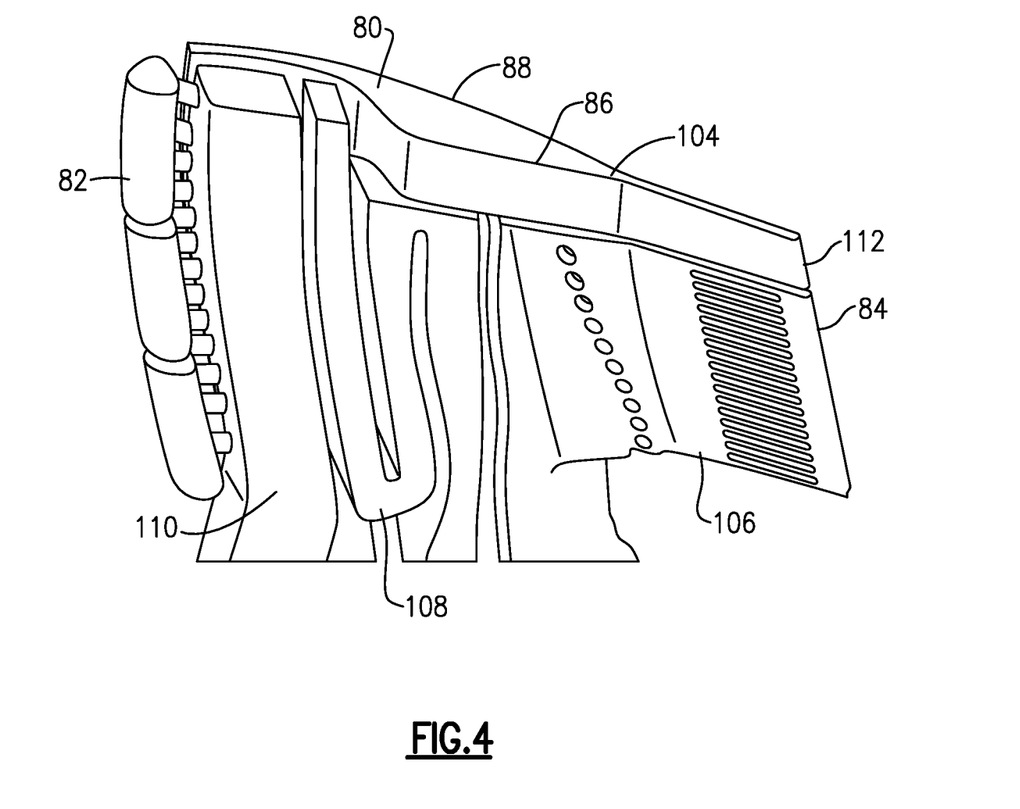
FIG. 4 shows a view of an airfoil core.

The serpentine core 108 forms a serpentine cooling passage arranged between the hybrid skin cooling passage and the pressure side 86 of the airfoil 78. The example serpentine core 108 provides "up" passages 120, 122 fluidly joined by a "down" passage 124. Each of the passages 120, 122, 124 extends in a generally radial direction. In an embodiment, cooling air flows forward. That is, the cooling air enters the serpentine core passage at an inlet 134, and flows upstream towards the leading edge 82. The serpentine cooling passage may be co-flowing or counter-flowing, for example. At least one of the passages 120, 122, 124 is shielded by the hybrid skin cavity on the suction side 88. In some embodiments, at least one passage 120, 122, 124 extends into a pressure side tip shelf and/or a recessed tip squealer pocket. As shown in FIGS. 3A and 4, the passages 120, 122 are joined radially inward of the tip 80. This permits the serpentine core 108 to fit radially inward of the tip flag core 104. In other words, the tip turn is reduced in radial height such that the turn is recessed radially inward of the tip flag core 104, minimizing the overall pressure loss and cooling air heat pickup due to the reduced streamwise length of the serpentine cooling passage. The reduction in pressure loss may be further improved by incorporating trip strip or turbulator features 123 (shown schematically in FIG. 6A) in the passages 122, 124 only along the pressure side surface of the serpentine cooling passage. The opposite suction side cooling passage surface does not require enhanced internal convective heat transfer since these surfaces of cooling passages 124 and 122 are immediately adjacent to a cold internal wall that is formed between the hybrid skin core 102 and the serpentine core 108. Eliminating the trip strips on the inner wall results in a smaller pressure loss, which allows the passages to meet the minimum backflow pressure, even under worst case tolerances. The pressure loss within the serpentine cooling passage is significantly diminished due to both the reduced streamwise L/Dh (Length/Hydraulic Diameter) of the serpentine cooling passage, and the one wall trip strip passages 124 and 122. The reduction in pressure loss within the serpentine passage enables a higher internal cooling pressure to be retained which may increase the pressure ratio across film cooling holes emanating from the serpentine cooling passage and increase the nominal and minimum back flow margin (BFM) required for achieving effective film cooling characteristics. In some embodiments, the passages 120, 122, 124 may include pedestals, crossovers, and/or ribs, depending upon the particular core design.

Figure 7B:
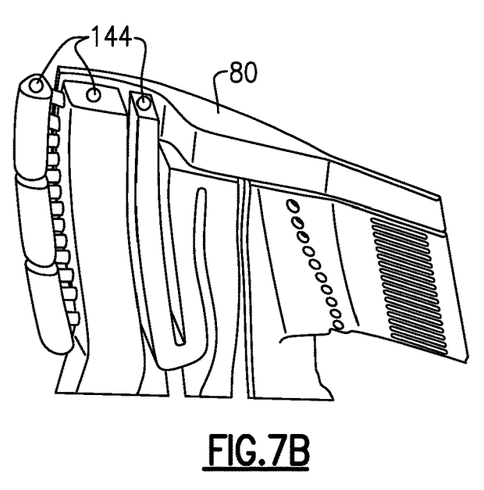
FIG. 7B shows a portion of an airfoil core.

Additionally the last "up" passage 122 of the serpentine cooling passage is designed to "print-out" along the airfoil tip 80 via a port 144, either within the pressure side tip shelf and/or within the tip squealer pocket. The "print-out" port 144 of the last "up" passage 122 of serpentine passage may be used to purge residual ceramic core material contained within the cast airfoil after alloy metal pour and solidification. The port 144 is a purge feature that may be fabricated directly from core material during the core injection process. Alternatively the last "up" passage 122 may comprise of a "solid rod" feature 140 (shown in FIGS. 7A-7B) around which ceramic core material is injected. In this instance the solid rod feature 140 may be made of quartz, alumina, platinum, or any other high melt temperature material. The solid rod 140 enables improved wall control and positioning of the last "up" passage 122, while also providing a method to stabilize the serpentine 108 cooling circuit passages and/or core section 142 forming a "plenum-like" geometry feature. In some embodiments, the port 144 is formed by the rod feature 140.

The leading edge core 110 forms a leading edge cooling passage which purges cooling air at the leading edge 82. In some embodiments, the cooling air is purged into a pressure side tip shelf. The leading edge cooling passage is also shielded by the hybrid skin core passage 102, which reduces heat pickup to the leading edge cooling passage. In some embodiments, a plurality of cavities 138 are arranged at the leading edge 82, and deliver film cooling to the leading edge 82. Cooling air enters the leading edge cooling passage via the inlet 136. The arrangement of the hybrid skin passage improves thermal cooling across the leading edge 82, which reduces the film cooling and improves durability of the airfoil 78.

A solid rod feature 140 (shown in FIGS. 7A-7B) may also be integrated into the leading edge core 110 which forms the leading edge cooling passage and serves a similar purpose as it pertains to serving as a conduit for leaching core material out of the cast airfoil 78. Additionally the solid rod feature 140 emanating from the leading edge core 110 may be combined and joined with another solid rod feature 140 emanating for the last "up" passage core 122. Each of the solid rod features 140 may be integrally "joined" by a common ceramic core "plenum-like" geometry feature 142 which extends radially outboard of the outer diameter of the airfoil tip 80, in which both solid rods 140 emanating from the leading edge core 110 and the serpentine core 108 are encapsulated. In this sense the two cores 110 and 108 are physically constrained in order to improve core stability and relative movement, thereby improving core manufacturing and casting process capability.

Complex multi-walled blades are desirable in high performance turbines because of their effective use of cooling air, but such multi-walled blades require complex and expensive manufacturing techniques. One known technique includes forming multiple cores that must be individually assembled into a full core. This may result in increased tolerances between the cores, increased cost for multiple core dies, and increased time of assembly for multiple cores. Another known core manufacturing technique involves a fugitive core process which requires multiple wax inserts for the ceramic injection process, and typically slows the rate of production and is more expensive and complex. The disclosed core 100 permits simplified manufacturing of a multi-walled blade.

The disclosed airfoil core 100 combines the suction side hybrid skin core 102 with the trailing edge core 106. These cores 102, 106 are connected at the trailing edge 84 via the tip flag 104 running from the skin core 102 to the trailing edge 84. The cores 102, 106 may also be connected at the root outside of the finished casting part. This combination of the hybrid skin core 102 and trailing edge core 106 allows the cores to be produced in a single die, reducing the die count. The combination also reduces the number of separate cores that need to be assembled into the final core 100. The connectivity reduces tolerances between the connected cores and provides better overall and relative core positioning control.

Figure 5A:
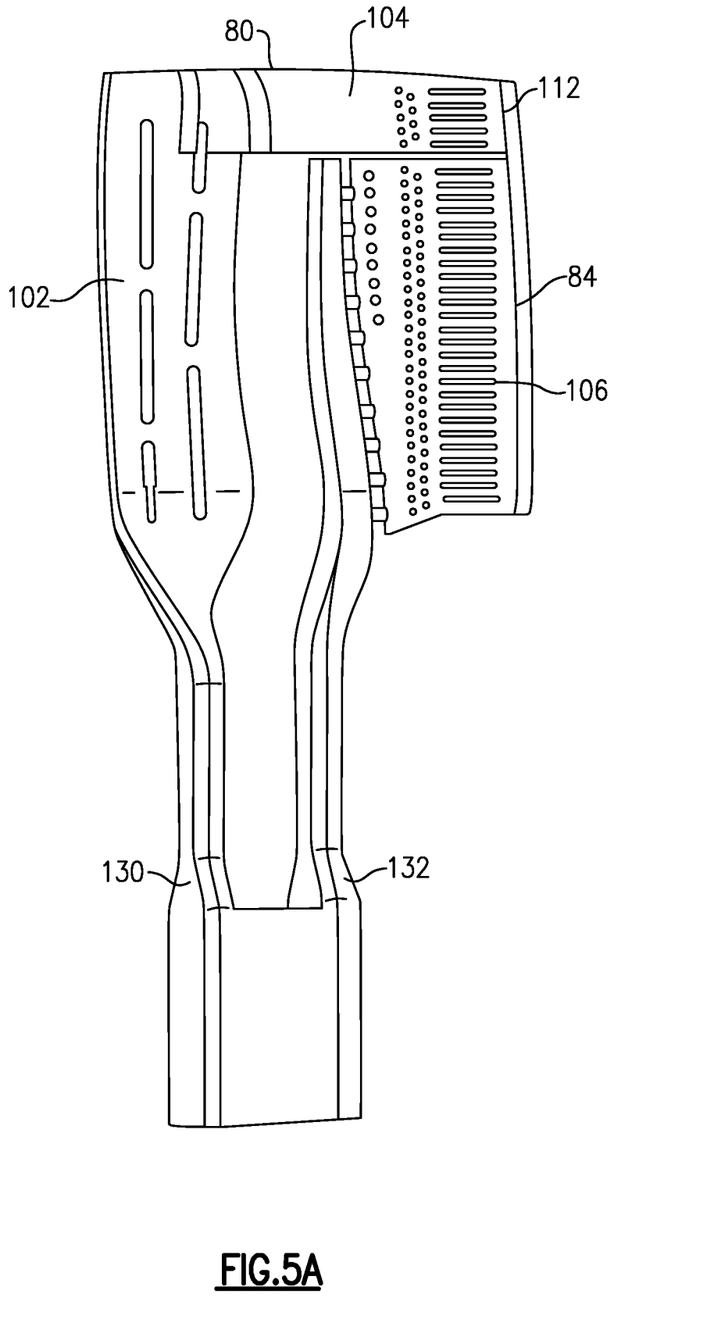
FIG. 5A shows a portion of an airfoil core from the pressure side.
Figure 5B:
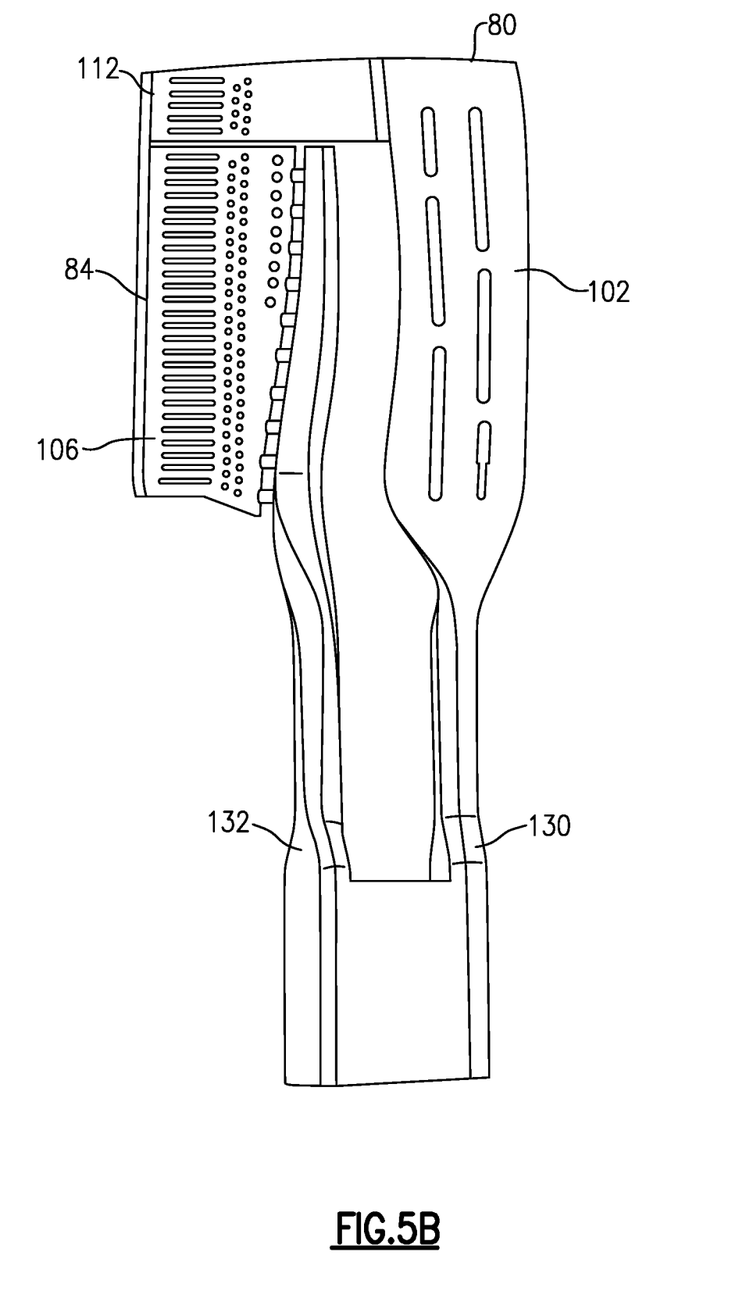
FIG. 5B shows a portion of an airfoil core from the suction side.

A method of forming the disclosed core 100 includes forming the trailing edge core 106 and hybrid skin core 102 in a single die, as shown in FIG. 5A-5B. The hybrid skin core 102 is connected to the trailing edge core 106 via the tip flag core 104. The skin core 102 may also be connected to the trailing edge core 106 at the root.

Figure 6A:
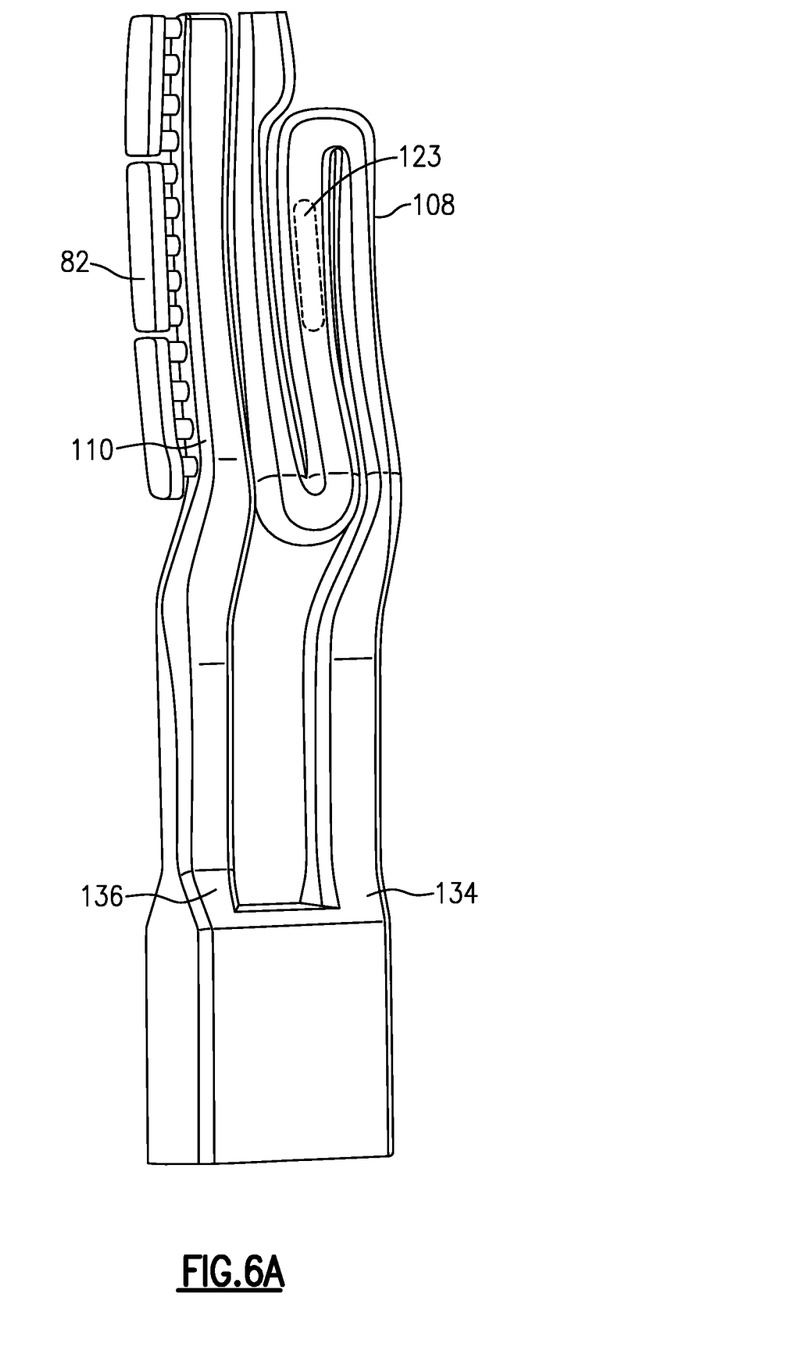
FIG. 6A shows a portion of an airfoil core from the pressure side.
Figure 6B:
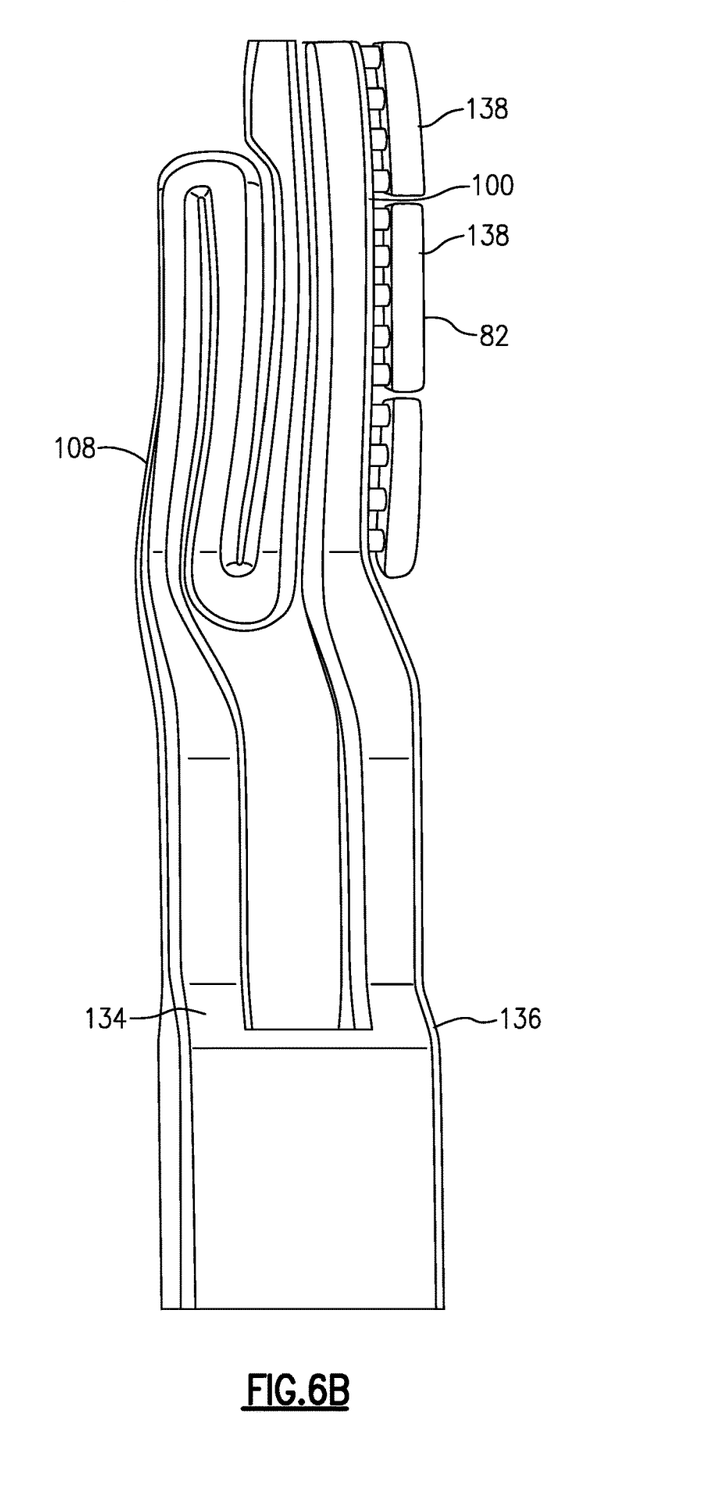
FIG. 6B shows a portion of an airfoil core from the suction side.

As shown in FIGS. 6A-6B, the leading edge core 110 and serpentine core 108 are formed. The leading edge core 110 and serpentine core 108 may be formed in a single die, or may be formed separately and then assembled together. The cores may be formed by injection molding. In an embodiment, each of the cores 102, 104, 106, 108, 110 are formed from a refractory metal core body material, silica, alumina, or another ceramic core body material.

In some embodiments, the hybrid skin core 102, tip flag core 104, and trailing edge core 106 are injection molded concurrently in a single die to form a contiguous first core portion. In some embodiments, the leading edge core 110 and serpentine core 108 are injection molded concurrently in a single die to form a contiguous second core portion. In other embodiments, some of these components are injected separately. The first core portion and second core portion are assembled to form an airfoil core 100, or cores 102, 104, 106, 108, 110 are assembled together to form the airfoil core 100.

In some embodiments, additional structures are used to maintain the arrangement of the cores 102, 104, 106, 108, 110 in the airfoil core 100. For example, a quartz or alumina rod 140 may extend from the serpentine core 108 or the leading edge core 110. In another example, a rod 140 may also be used in the trailing edge core 106 and tip flag core 104. A rod 140 may be used to join any two adjacent cores 102, 104, 106, 108, 110. Such rods 140 provide additional stabilization between cores, preventing relative movement during the manufacturing process.

Once the core portions 102, 104, 106, 108, 110 are assembled into the airfoil core 100, the airfoil 78 is formed about the airfoil core 100. The airfoil core 100 is placed into a wax tool, which is used to create a wax pattern of the exterior shape of the airfoil 78. This wax tool may form the airfoil surface 79, platform 76, and, root 74 (shown in FIG. 2A). After several wax patterns are formed, these are placed into an array, and ceramic slurry and particles are poured over the wax patterns to create a mold shell. Finally, the wax is melted out to leave a void in the mold shell, which is later filled with a molten metallic material, for example.

This method provides a quicker and simpler process of producing a multi-walled blade. The core arrangement may also provide better control of the core portions. For example, the disclosed core 100 enables tighter control of the rib between the trailing edge core and tip flag core, and better positional control of the hybrid skin core.

It should also be understood that although a particular component arrangement is disclosed in the illustrated embodiments, other arrangements will benefit herefrom. Although particular step sequences are shown, described, and claimed, it should be understood that steps may be performed in any order, separated or combined unless otherwise indicated and will still benefit from the embodiments of the present invention. Additionally it is important to note that any complex multi-facetted resupply geometries that bridge centrally located main body cooling passages and peripherally located hybrid skin core cooling cavity passages can be created at any number of radial, circumferential, and/or tangential locations within an internal cooling configuration. The quantity, size, orientation, and location will be dictated by the necessity to increase the local thermal cooling effectiveness and achieve the necessary thermal performance required to mitigate hot section part cooling airflow requirements, as well as, meet part and module level durability life, stage efficiency, module, and overall engine cycle performance and mission weight fuel burn requirements.

Additionally those of ordinary skill in this art should recognize that core fabrication methods utilizing fugitive cores, injection molded, and additive manufacturing methods may be implemented to provide even greater robustness and flexibility in the manufacturing of complex multi-core/multi-wall design configurations similar to the final core 100. These advanced core manufacturing processes eliminate the requirement and need for multiple complex multi-pull and/or single pull core die tooling and core assembly. Additionally geometric core passage and core passage cooling design geometry features (i.e.; trip strips, pin fins, pedestals, cross overs, impingement ribs, etc.) associated with conventional core die tooling are no longer limited. Core passage and cooling feature geometries constrained to specific shapes, sizes, and orientations, due to core manufacturing limitations associated with core die tooling such as back-lock, die pull orientations, and core finishing processes may be significantly reduced and/or eliminated allowing more cooling design flexibility and optimization of integral multi-wall core cooling configurations.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. A method of forming an airfoil, comprising:
forming a hybrid skin core, a tip flag core, and a trailing edge core, wherein the hybrid skin core, tip flag core, and trailing edge core are connected to form a first core portion;
forming a leading edge core and a serpentine core, the leading edge core and the serpentine core are separate from the first core portion;
assembling the first core portion, the leading edge core, and the serpentine core together to form an airfoil core;
inserting a rod into the leading edge core before forming the airfoil and the rod extends to a feature radially outward of the tip flag core; and
forming an airfoil around the airfoil core after the inserting the rod.

2. The method of claim 1, wherein the airfoil is formed by investment casting.

3. The method of claim 1, wherein the hybrid skin core, tip flag core, trailing edge core, leading edge core, and serpentine core are injection molded.

4. The method of claim 3, wherein e trailing edge core and the hybrid skin core are formed concurrently in a first die.

5. The method of claim 4, wherein the tip flag core, trailing edge core, and hybrid skin core are formed concurrently in the first die.

6. The method of claim 5, wherein the first core portion is a contiguous core portion.

7. The method of claim 3, wherein the leading edge core and the serpentine core are formed concurrently in a second die.

8. The method of claim 7, wherein the second core portion is a contiguous core portion.

9. The method of claim 1, wherein the leading edge core and the serpentine core are connected to form a second core portion.

10. The method of claim 1, wherein the rod is removed after forming the airfoil to form a port near a leading edge of the airfoil.

11. The method of claim 1, wherein the assembling the airfoil core comprises inserting a rod into the serpentine core and the tip flag core.

12. The method of claim 1, wherein the airfoil core contains one of ceramic, alumina, silica, and a metallic alloy.

* * * * *